United States Patent
Feng

(10) Patent No.: US 10,248,289 B2
(45) Date of Patent: Apr. 2, 2019

(54) APPLICATION ICON DISPLAY CONTROL METHOD AND TERMINAL

(71) Applicant: Yulong Computer Telecommunication Scientific (Shenzhen) Co., Ltd., Shenzhen, Guangdong (CN)

(72) Inventor: Rui Feng, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 373 days.

(21) Appl. No.: 15/171,108

(22) Filed: Jun. 2, 2016

(65) Prior Publication Data

US 2016/0274748 A1    Sep. 22, 2016

Related U.S. Application Data

(63) Continuation-in-part of application No. PCT/CN2013/089839, filed on Dec. 18, 2013.

(51) Int. Cl.
| | | |
|---|---|---|
| G06F 3/048 | (2013.01) | |
| G06F 3/0482 | (2013.01) | |
| H04M 1/725 | (2006.01) | |
| G06F 3/0481 | (2013.01) | |
| G06F 3/0484 | (2013.01) | |
| G06F 3/0488 | (2013.01) | |

(52) U.S. Cl.
CPC ........ *G06F 3/0482* (2013.01); *G06F 3/04817* (2013.01); *G06F 3/04842* (2013.01); *G06F 3/04883* (2013.01); *H04M 1/72519* (2013.01); *H04M 1/72583* (2013.01); *H04M 1/72586* (2013.01); *H04M 2250/22* (2013.01)

(58) Field of Classification Search
CPC .. G06F 3/0482; G06F 3/04817; G06F 3/0488; G06F 2203/04803
See application file for complete search history.

(56) References Cited

U.S. PATENT DOCUMENTS

| | | | | |
|---|---|---|---|---|
| 2007/0083827 A1* | 4/2007 | Scott | ....................... | G06F 9/451 715/811 |
| 2009/0031253 A1* | 1/2009 | Lee | ..................... | G06F 3/04817 715/835 |
| 2010/0095227 A1* | 4/2010 | Park | ..................... | G06F 3/0482 715/762 |
| 2011/0035691 A1* | 2/2011 | Kim | ..................... | G06F 3/04817 715/765 |
| 2011/0252381 A1* | 10/2011 | Chaudhri | ............ | G06F 3/04883 715/838 |

(Continued)

FOREIGN PATENT DOCUMENTS

| | | |
|---|---|---|
| CN | 101833418 A | 9/2010 |
| CN | 102289344 A | 12/2011 |
| CN | 102693087 A | 9/2012 |

*Primary Examiner* — Linh K Pham
(74) *Attorney, Agent, or Firm* — Young Basile Hanlon & MacFarlane, P.C.

(57) ABSTRACT

The present disclosure provides an application icon display control method and a terminal. The application icon display control method includes distributing a number of preset application icons in gap regions of a region in which a frequently used icon bar of a terminal is located. The gap regions are the remaining regions obtained by removing regions occupied by frequently used application icons from the region in which the frequently used icon bar is located.

15 Claims, 5 Drawing Sheets

(56) References Cited

U.S. PATENT DOCUMENTS

| | | | | |
|---|---|---|---|---|
| 2013/0125056 A1* | 5/2013 | Suda | ............... | G06F 3/0488 |
| | | | | 715/846 |
| 2013/0139109 A1* | 5/2013 | Kim | ............... | G06F 3/04883 |
| | | | | 715/835 |
| 2013/0145316 A1* | 6/2013 | Heo | ............... | G06F 3/04817 |
| | | | | 715/810 |
| 2013/0321340 A1* | 12/2013 | Seo | ............... | G06F 1/1641 |
| | | | | 345/174 |
| 2013/0332886 A1* | 12/2013 | Cranfill | ............... | G06F 3/0482 |
| | | | | 715/835 |
| 2014/0033095 A1* | 1/2014 | Koba | ............... | G06F 3/04817 |
| | | | | 715/765 |
| 2014/0096047 A1* | 4/2014 | Ha | ............... | G06F 3/04817 |
| | | | | 715/768 |
| 2014/0152597 A1* | 6/2014 | Lee | ............... | G06F 3/0416 |
| | | | | 345/173 |

\* cited by examiner

APPLICATION ICON DISPLAY CONTROL METHOD AND TERMINAL

CROSS-REFERENCE TO RELATED APPLICATIONS

This application is a continuation-in-part of International Patent Application No. PCT/CN2013/089839, entitled "APPLICATION ICON DISPLAY CONTROL METHOD AND TERMINAL", filed on Dec. 18, 2013, which is hereby incorporated by reference in its entirety.

TECHNICAL FIELD

The present disclosure relates to communication technology field, and particularly to an application icon display control method and a terminal.

BACKGROUND

Presently, operating an icon or a page can be realized by exerting a long press or other step on an icon displayed on the desktop of a terminal. When exerting a click or other step on a region in which no icon is located, the system automatically recognizes that a certain adjacent icon is clicked and the application corresponding to the icon can be started.

With the increase of applications, menu pages correspondingly increase. A frequently used icon bar can be displayed below menu pages, and a number of frequently used icons can be displayed in the frequently used icon bar. When flipping the menu pages, the frequently used icon bar stay unchanged. Thus, an invisible screen switch boundary exists between the menu pages and the frequently used icon bar.

The screen of the terminal gradually increases, thus the region in which the frequently used icon bar is located also become great, and gap regions among the frequently used icons also become great. Present step method cannot fully utilize the gaps among the icons, and response for steps exerted on the gaps can be simple.

SUMMARY

Based on at least one of the above-mentioned problems, the present disclosure provides a new application icon display control technology, which can fully utilize gap regions of the frequently used icon bar.

In view of this, one aspect of the present disclosure provides an application icon display control method which includes distributing a number of preset application icons in gap regions of a region in which a frequently used icon bar of a terminal is located, wherein the gap regions are the remaining regions obtained by removing regions occupied by frequently used icons from the region in which the frequently used icon bar is located.

In this implementation, with the increase of the screen size of the terminal, the gap regions of the frequently used icon bar also increase. By means of distributing a number of application icons preset by a user in the gap regions, the gap regions can be fully utilized. The user can operate the application icons distributed in the gap regions. By means of setting more application icons in the frequently used bar, the number of application icons on menu pages can be accordingly reduced. As the frequently used icon bar is always located in a single hand operation range of the user, the step of flipping pages by moving fingers significantly to search application icons can be thus eliminated, which can facilitate the user to find corresponding application icons.

In the above-mentioned technical solution, preferably, designated gap regions among the frequently used icons can be divided according to use frequency of application icons to be assigned to corresponding application icons. Wherein, the application icon having the highest use frequency can be adjacent to a screen edge of the terminal.

To facilitate single hand operation of the user, the selection of the gap regions can be determined according to use frequency of the application icons. For example, the application icon having a higher use frequency can be distributed in a gap region which is greater and more adjacent to the touch range of the user's finger, for example, the left or right side of the terminal, such that the application icon can be easily operated.

Additionally, the shape of the gap regions in the frequently used icon bar can be irregular, thus the shape of the application icons can be also irregular so as to match the shape of the gap regions. The gap regions of the frequently used bar can be filled similar to puzzle.

In any of the above-mentioned technical solutions, preferably, some of the gap regions among the frequently used icons can be reserved for a preset number of application icons which are not dynamically distributed on the current menu page and are also not located in the frequently used icon bar.

For further facilitating the user to search applications icons, some of the gap regions of the frequently used icon bar can be reserved for application icons which are not dynamically distributed on the current menu page, such that it can be convenient for the user to operate application icons on other menu pages, and there is no need to page back and forth to find needed application icons. Other of the gap regions can be still used for application icons set by the user.

In any of the technical solutions, preferably, upon receiving a triggering operation from the user, the plurality of application icons can be displayed, or the application corresponding to the gap region on which the triggering operation is exerted can be started.

Setting application icons to be in the gap regions of the frequently used icon bar is not only for fully utilizing the gap regions, but also for protecting privacy information. Some applications are related to user's privacy, e.g., short messages. Generally, when a new short message is received, the user does not wish that others can get the content of the short message easily. However, in related art, displaying prompt on the short message icon directly or on other position directly is not beneficial for protecting user's privacy. In this implementation, normally, the application icons in the gap regions can be hidden, and only when the user wants to use the application icons, the application icons can be displayed. Therefore, the user can set some private application icons to be in the gap regions, which facilitates the user to use the private application icons, and further protects user's privacy.

In any of the above-mentioned technical solution, preferably, when any of the application icons receives a message notification, for reminding the user, the display status of the frequently used icon adjacent to the application icon the application corresponding to which has received the message notification can be changed or the background color the region of the application icon can be changed.

For the reason of that normally the application icons in the gap regions can be hidden, when the application receives a new message notification, the user needs to know that there is a new message notification without direct prompt. Therefore, in the technical solution, by way of changing the status of the adjacent frequently used icon, the user can be reminded that the application corresponding to the hidden application icon has received a new message notification.

In any of the above-mentioned technical solution, preferably, changing the display status of the frequently icons includes changing the distance between the adjacent frequently used icon and the other frequently used icons.

Another aspect of the present disclosure further provides a terminal which includes a display control unit configured to distribute a number of preset application icons in gap regions of a region in which a frequently used icon bar of a terminal is located, wherein the gap regions are the remaining regions obtained by removing regions occupied by frequently used icons from the region in which the frequently used icon bar is located.

In this implementation, with the increase of the screen size of the terminal, the gap regions of the frequently used icon bar also increase. By means of distributing a number of application icons preset by a user in the gap regions, the gap regions can be fully utilized. The user can operate the application icons distributed in the gap regions. By means of setting more application icons in the frequently used bar, the number of application icons on menu pages can be accordingly reduced. As the frequently used icon bar is always located in a single hand operation range of the user, the step of flipping pages by moving fingers significantly to search application icons can be thus eliminated, which can facilitate the user to find corresponding application icons.

In the above-mentioned technical solution, preferably, the display control unit includes a region distributing unit configured to divide designated gap regions among the frequently used icons according to use frequency of application icons to be assigned to corresponding application icons. Wherein, the application icon having the highest use frequency can be adjacent to a screen edge of the terminal.

To facilitate single hand operation of the user, the selection of the gap regions can be determined according to use frequency of the application icons. For example, the application icon having a higher use frequency can be distributed in a gap region which is greater and more adjacent to the touch range of the user's finger, for example, the left or right side of the terminal, such that the application icon can be easily operated.

Additionally, the shape of the gap regions in the frequently used icon bar can be irregular, thus the shape of the application icons can be also irregular so as to match the shape of the gap regions. The gap regions of the frequently used bar can be filled similar to puzzle.

In any of the above-mentioned technical solutions, preferably, the region distributing unit can be further configured to reserve some of the gap regions among the frequently used icons for a preset number of application icons which are not dynamically distributed on the current menu page and are not located in the frequently used icon bar.

For further facilitating the user to search applications icons, some of the gap regions of the frequently used icon bar can be reserved for application icons which are not dynamically distributed on the current menu page, such that it is convenient for the user to operate application icons on other menu pages, and there is no need to page back and forth to find needed application icons. Other of the gap regions can be still used for application icons set by the user.

In any of the technical solutions, preferably, the display control unit can be further configured to display the plurality of application icons or start the application corresponding to the gap region on which the triggering operation is exerted upon receiving a triggering operation from the user.

Setting application icons to be in the gap regions of the frequently used icon bar is not only for fully utilizing the gap regions, but also for protecting privacy information. Some applications are related to user's privacy, e.g., short messages. Generally, when a new short message is received, the user does not wish that others can get the content of the short message easily. However, in related art, displaying prompt on the short message icon directly or on other position directly is not beneficial for protecting user's privacy. In this implementation, normally, the application icons in the gap regions can be hidden, and only when the user wants to use the application icons, the application icons can be displayed. Therefore, the user can set some private application icons to be in the gap regions, which facilitates the user to use the private application icons, and further protects user's privacy.

In any of the above-mentioned technical solution, preferably, the display control unit includes a display status adjusting unit configured to change the display status of the frequently used icon adjacent to the application icon the application corresponding to which has received the message notification or change the background color of the region of the application icon when any of the application icons receives a message notification so as to remind the user.

For the reason of that normally the application icons in the gap regions can be hidden, when one application receives a new message notification, the user needs to know that there is a new message notification without direct prompt. Therefore, in the technical solution, by way of changing the status of the adjacent frequently used icon, the user can be reminded that the application corresponding to the hidden application icon has received a new message notification.

In any of the above-mentioned technical solution, preferably, changing the display status of the frequently icons includes changing the distance between the adjacent frequently used icon and the other frequently used icons.

The above specifically illustrates the technical solution of the present disclosure in combination with the accompanying drawings. The present disclosure fully utilizes the gap regions of the frequently used icon bar, and a number of application icons preset by the user can be distributed in the gap regions, which facilitates user's step on the application icons, and accordingly reduces the number of the application icons on the menu pages, and can also protects the application data relating to user's privacy.

DETAILED DESCRIPTION

To understand the above-mentioned purposes, features and advantages of the present disclosure more clearly, the present disclosure will be further described in detail below in combination with the accompanying drawings and the specific implementations. It should be noted that, the implementations of the present application and the features in the implementations can be combined with one another without conflicts.

Specific details will be described below for sufficiently understanding the present disclosure. However, the present disclosure can also be implemented by adopting other manners different from those described herein. Accordingly, the protection scope of the present disclosure is not limited by the specific implementations disclosed below.

Figure 1:
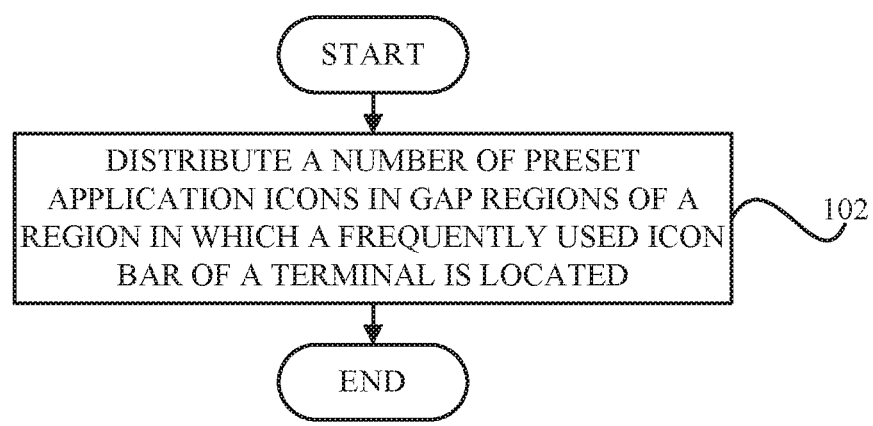
FIG. 1 is a flow chart of an application icon display control method in accordance with an example implementation of the present disclosure.

FIG. 1 is a flow chart of an application icon display control method in accordance with an example implementation of the present disclosure.

As shown in FIG. 1, an application icon display control method in accordance with an example implementation of the present disclosure includes step 102, distributing a number of preset application icons in gap regions of a region in which a frequently used icon bar of a terminal is located, wherein the gap regions are the remaining regions obtained by removing regions occupied by frequently used icons from the region in which the frequently used icon bar is located.

In this implementation, with the increase of the screen size of the terminal, the gap regions of the frequently used icon bar also increase. By means of distributing a number of application icons preset by a user in the gap regions, the gap regions can be fully utilized. The user can operate the application icons distributed in the gap regions. By means of setting more application icons in the frequently used bar, the number of application icons on menu pages can be accordingly reduced. As the frequently used icon bar is always located in a single hand operation range of the user, the step of flipping pages by moving fingers significantly to search application icons is thus eliminated, which can facilitate the user to find corresponding application icons.

In the above-mentioned technical solution, preferably, designated gap regions among the frequently used icons can be divided according to use frequency of application icons to be assigned to corresponding application icons. Wherein, the application icon having the highest use frequency can be adjacent to a screen edge of the terminal.

To facilitate single hand operation of the user, the selection of the gap regions can be determined according to use frequency of the application icons. For example, the application icon having a higher use frequency can be distributed in a gap region which is greater and more adjacent to the touch range of the user's finger, for example, the left or right side of the terminal, such that the application icon can be easily operated.

Additionally, the shape of the gap regions in the frequently used icon bar can be irregular, thus the shape of the application icons can be also irregular so as to match the shape of the gap regions. The gap regions of the frequently used bar can be filled similar to puzzle.

In any of the above-mentioned technical solutions, preferably, some of the gap regions among the frequently used icons can be reserved for a preset number of application icons which are not dynamically distributed on the current menu page and are also not located in the frequently used icon bar.

For further facilitating the user to search applications icons, some of the gap regions of the frequently used icon bar can be reserved for application icons which are not dynamically distributed on the current menu page, such that it is convenient for the user to operate application icons on other menu pages, and there is no need to page back and forth to find needed application icons. Other of the gap regions can be still used for application icons set by the user.

In any of the technical solutions, preferably, upon receiving a triggering step from the user, the plurality of application icons can be displayed, or the application corresponding to the gap region on which the triggering operation is exerted can be started.

Setting application icons to be in the gap regions of the frequently used icon bar is not only for fully utilizing the gap regions, but also for protecting privacy information. Some applications are related to user's privacy, e.g., short messages. Generally, when a new short message is received, the user does not wish that others can get the content of the short message easily. However, in related art, displaying prompt on the short message icon directly or on other position directly is not beneficial for protecting user's privacy. In this implementation, normally, the application icons in the gap regions can be hidden, and only when the user wants to use the application icons, the application icons can be displayed. Therefore, the user can set some private application icons to be in the gap regions, which facilitates the user to use the private application icons, and further protects user's privacy.

In another implementation, it can be assumed that the user has known the application icon corresponding to each gap region. When some gap region is triggered by the user, the application corresponding to the gap region can be directly started, and the main interface of the application can be displayed, thus there is no need to display the application icon, which increase step efficiency.

In any of the above-mentioned technical solution, preferably, when any of the application icons receives a message notification, the display status of the frequently used icon adjacent to the application icon the application corresponding to which has received the message notification can be changed or the background color the region of the application icon can be changed so as to remind the user.

For the reason of that normally the application icons in the gap regions can be hidden, when one application receives a new message notification, the user needs to know that there is a new message notification without direct prompt. Therefore, in the technical solution, by way of changing the status of the adjacent frequently used icon, the user can be reminded that the application corresponding to the hidden application icon has received a new message notification.

In any of the above-mentioned technical solution, preferably, changing the display status of the frequently icons includes changing the distance between the adjacent frequently used icon and the other frequently used icons.

Figure 2:
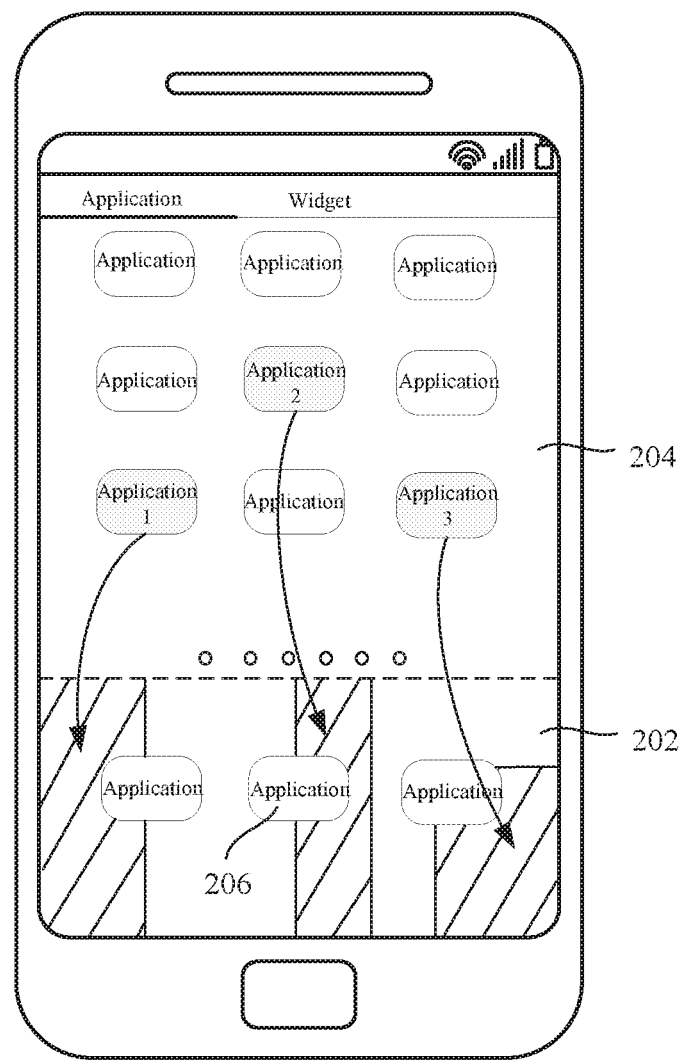
FIG. 2 is a schematic view showing that application icons are distributed in gap regions of a frequently used icon bar in accordance with an example implementation of the present disclosure.
Figure 3:
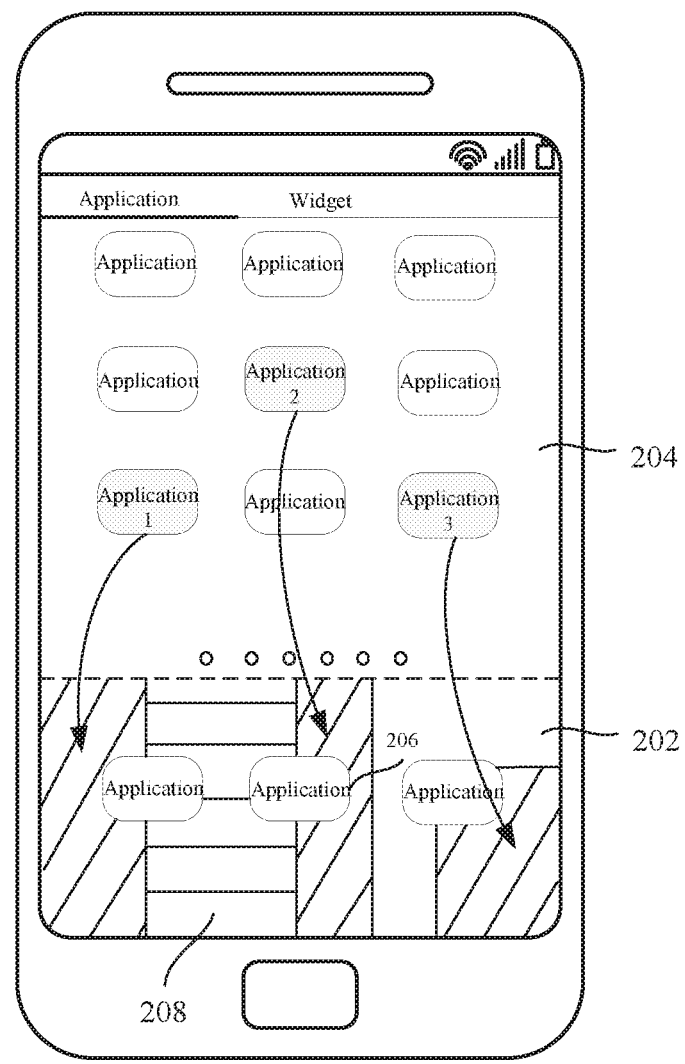
FIG. 3 is a schematic view showing that application icons are distributed in gap regions of a frequently used icon bar in accordance with another example implementation of the present disclosure.
Figure 4:
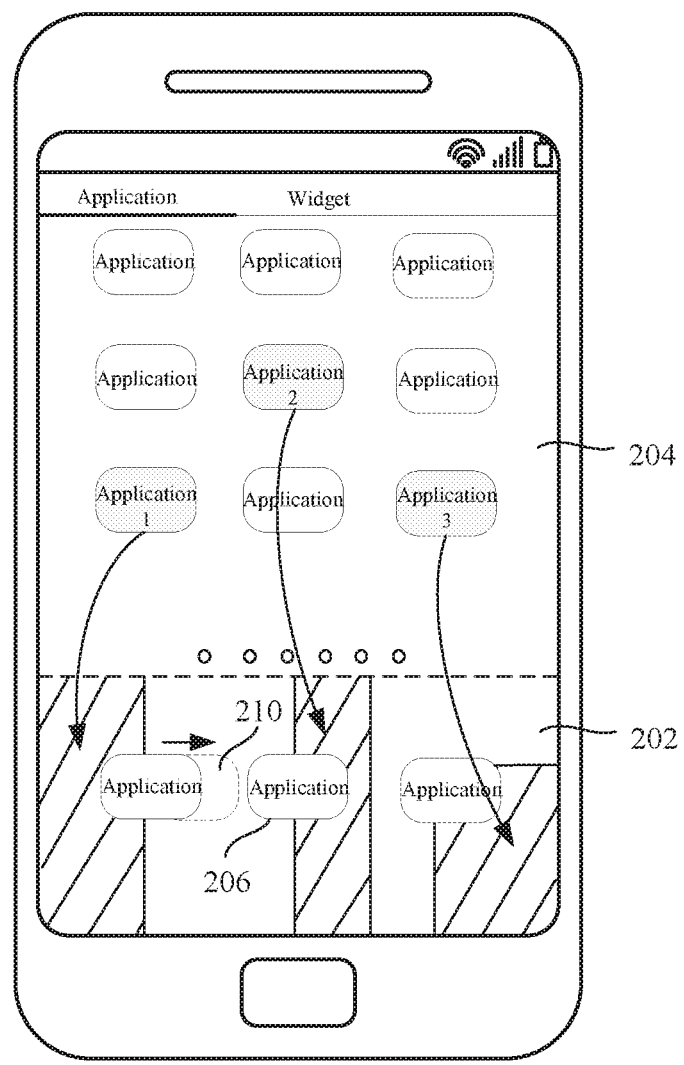
FIG. 4 is a prompt schematic view showing that a message notification has received in accordance with an example implementation of the present disclosure.

The following will further illustrate the application icon display control method of the present disclosure in combination with FIGS. 2-4.

Some terms are firstly illustrated.

Menu pages 204 can be the pages which can be flipped by the user and each menu page 204 includes a number of application icons.

The frequently used icon bar 202 is the bar which includes frequently used application icons 206 and stays unchanged when the menu pages 204 can be flipped.

The gap regions of the frequently used icon bar 202 can be the remaining regions obtained by removing the regions occupied by the frequently used icons from the region of the frequently used icon bar 202.

The present disclosure utilizes the gap regions of the frequently used bar. The user can select some application icons and the selected application icons can be set to be distributed in the gap regions. As shown in FIG. 2, the icon of the application 1, the icon of the application 2, and the icon of the application 3 can be selected to be distributed in the gap regions. From FIG. 2, it can be known that the size and shape of the gap regions corresponding to different application icons can be different. In this implementation, which gap region should be assigned to which of the three application icons can be determined according to the use of the three applications. For example, the use frequency of the application 1 and the application 3 can be relatively higher, thus the icon of the application 1 and the icon of the application 3 can be set to be distributed in the regions adjacent to the operation range of the user's finger, for example, two sides of the screen. Furthermore, the sizes of the gap regions respectively corresponding to the icon of the application 1 and the icon of the application 3 can be relatively greater, which facilitates user's operation.

Normally, the application icons distributed in the gap regions can be invisible. Thus, the applications relating to user's privacy, such as short message applications, social network applications, and online chat applications, can be set to be in the gap regions of the frequently used icon bar 202. When the user wants to operate the applications, the user can perform certain operations to display the applications. The certain operations can include sliding up, sliding down, long press, drawing an arc, and so on.

After distributing the preset application icons, some gap regions of the frequently used icon bar can be not filled, and other application icons can be dynamically displayed in the blank regions.

As shown in FIG. 3, other application icons can be distributed in the blank region 208. The terminal usually includes a number of menu pages. When the current menu page is the third menu page, if the user wants to use some application the icon corresponding to which is on the first menu page, the user needs to page forward to the first menu page, and then the user operates the application icon to start the application, which is a tedious operation. To avoid the tedious operation, when the current menu page is the third page, the application icons of the first menu page and the second menu page which are frequently used and are also not in the frequently used icon bar can be set to be in the blank region 208. By doing so, the user can directly start the application by performing operations in the frequently used icon bar, and the user does not need to page back and forth to find the application icon, which results in that when the user flips pages, the application icons in the blank region can be continuously updated, and the user cannot see the continuous update of the application icons in the blank regions, thus page display can be not affected.

If related application icons are distributed in the frequently used icon bar, these application icons may not be displayed on the menu pages, which can reduce the number of the application icons in the menu pages, and the application icons can be displayed as concentrated as possible.

Normally, the application icons can be not visible, thus it is desirable to provide a method which can prompt the user to look up message notifications of the applications and can also protect user's privacy. The implementation adopts a new prompt manner. As shown in FIG. 4, it can be assumed that the application 1 has received a new message notification; the user can be reminded by changing the position of the adjacent frequently used icon. As shown in FIG. 4, the frequently used icon can be moved to a new position 210.

Besides the prompt manner, the user can be reminded by changing the color of the background of the region of the application icon the application corresponding to which has received a message notification, thus the user can be reminded that the application the icon corresponding to which is in the region has received a message notification. Thus, the message content can be not directly displayed for the user, and accordingly user's privacy can be protected.

Therefore, it is improper to directly display prompt on associated application icons, such as message prompt for private contacts, update of social messages, and so on. It is not convenient for the user to start a private mode to look up the prompt. Thus the content related to private contacts can be set to be distributed in the space around the frequently used icon bar, and communication with private contacts can be quickly established.

Figure 5:
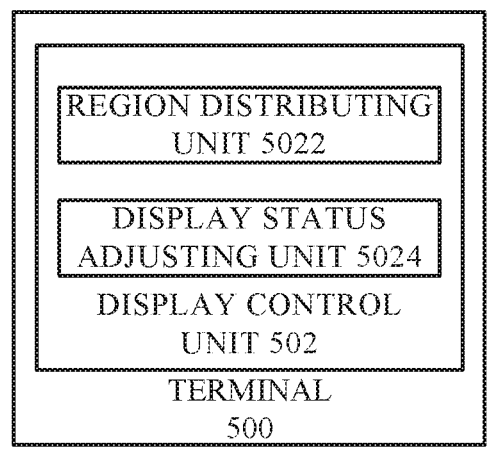
FIG. 5 is a block diagram of a terminal in accordance with an example implementation of the present disclosure.

FIG. 5 is a block diagram of a terminal in accordance with an example implementation of the present disclosure.

As shown in FIG. 5, a terminal 500 in accordance with an example implementation of the present disclosure includes a display control unit 502 configured to distribute a number of preset application icons in gap regions of a region in which a frequently used icon bar of a terminal is located, wherein the gap regions can be the remaining regions obtained by removing regions occupied by frequently used icons from the region in which the frequently used icon bar is located.

In this implementation, with the increase of the screen size of the terminal, the gap regions of the frequently used icon bar also increase. By means of distributing a number of application icons preset by a user in the gap regions, the gap regions can be fully utilized. The user can operate the application icons distributed in the gap regions. By means of setting more application icons in the frequently used bar, the number of application icons on menu pages can be accordingly reduced. As the frequently used icon bar is always located in a single hand operation range of the user, the step of flipping pages by moving fingers significantly to search application icons can be thus eliminated, which can facilitate the user to find corresponding application icons.

In the above-mentioned technical solution, preferably, the display control unit 502 includes a region distributing unit 5022 configured to divide designated gap regions among the frequently used icons according to use frequency of application icons to be assigned to corresponding application icons. Wherein, the application icon having the highest use frequency can be adjacent to a screen edge of the terminal.

To facilitate single hand operation of the user, the selection of the gap regions can be determined according to use frequency of the application icons. For example, the application icon having a higher use frequency can be distributed in a gap region which is greater and more adjacent to the touch range of the user's finger, for example, the left or right side of the terminal, such that the application icon can be easily operated.

Additionally, the shape of the gap regions in the frequently used icon bar can be irregular, thus the shape of the application icons can be also irregular so as to match the shape of the gap regions. The gap regions of the frequently used bar can be filled similar to puzzle.

In any of the above-mentioned technical solutions, preferably, the region distributing unit 5022 is further configured to reserve some of the gap regions among the frequently used icons for a preset number of application icons which are not dynamically distributed on the current menu page and are also not located in the frequently used icon bar.

For further facilitating the user to search applications icons, some of the gap regions of the frequently used icon bar can be reserved for application icons which are not dynamically distributed on the current menu page, such that it can be convenient for the user to operate application icons on other menu pages, and there is no need to page back and forth to find needed application icons. Other of the gap regions are still used for application icons set by the user.

In any of the technical solutions, preferably, the display control unit 502 can be further configured to display the plurality of application icons or start an application corresponding to the gap region on which the triggering operation is exerted upon receiving a triggering operation from the user.

Setting application icons to be in the gap regions of the frequently used icon bar is not only for fully utilizing the gap regions, but also for protecting privacy information. Some applications are related to user's privacy, e.g., short messages. Generally, when a new short message is received, the user does not wish that others can get the content of the short message easily. However, in related art, displaying prompt on the short message icon directly or on other position directly is not beneficial for protecting user's privacy. In this implementation, normally, the application icons in the gap regions can be hidden, and only when the user wants to use the application icons, the application icons can be displayed. Therefore, the user can set some private application icons to be in the gap regions, which facilitates the user to use the private application icons, and further protects user's privacy.

In any of the above-mentioned technical solution, preferably, the display control unit 502 includes a display status adjusting unit 5024 configured to change the display status of the frequently used icon adjacent to the application icon the application corresponding to which has received the message notification or the background color the region of the application icon when any of the application icons receives a message notification.

For the reason of that normally the application icons in the gap regions can be hidden, when one application receives a new message notification, the user needs to know that there is a new message notification without direct prompt. Therefore, in the technical solution, by way of changing the status of the adjacent frequently used icon, the user can be reminded that the application corresponding to the hidden application icon receives a new message notification.

In any of the above-mentioned technical solution, preferably, changing the display status of the frequently icons includes changing the distance between the adjacent frequently used icon and the other frequently used icons.

The above specifically illustrates the technical solution of the present disclosure in combination with the accompanying drawings. The present disclosure fully utilizes the gap regions of the frequently used icon bar, and a number of application icons preset by the user can be distributed in the gap regions, which facilitates user's operation on the application icons, and accordingly reduces the number of the application icons on the menu pages, and can also protects the application data relating to user's privacy.

Figure 6:
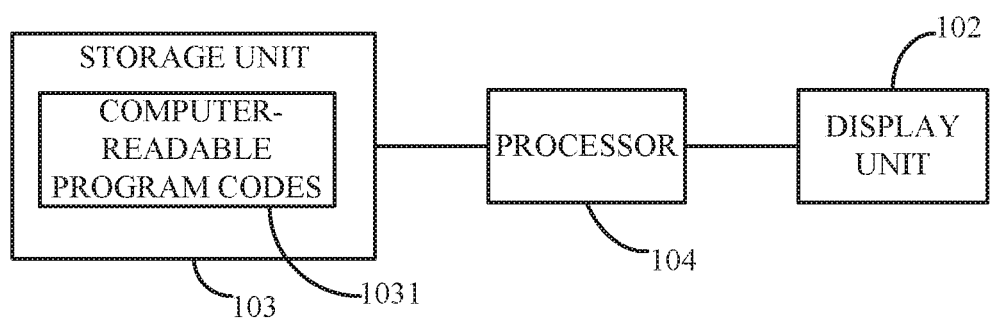
FIG. 6 is a block diagram of a terminal in accordance with another example implementation of the present disclosure.

FIG. 6 is a block diagram of a terminal in accordance with another example implementation of the present disclosure. The terminal can include but not limited to a display unit 102, a storage unit 103, and a processor 104. The display unit 102 and the storage unit 103 can be electrically connected to the processor 104.

The display unit 102 can be configured to display visual information, such as application icons, for example.

The storage unit 103 can be configured to store a plurality of computer-readable program codes 1031. The storage unit 103 can be a read only memory (ROM), a random access memory (RAM), a U-disk, a removable hard disk, etc.

The processor 104 can include multiple cores for multi-thread or parallel processing. In this implementation, the processor 104 can be configured to execute the plurality of computer-readable program codes 1031 to distribute a plurality of preset application icons in gap regions of a region in which a frequently used icon bar of a terminal is located, wherein the gap regions are the remaining regions obtained by removing regions occupied by frequently used application icons from the region in which the frequently used icon bar is located.

In this implementation, preferably, designated gap regions among the frequently used icons can be divided according to use frequency of application icons to be assigned to corresponding application icons, and the application icon having the highest use frequency can be adjacent to a screen edge of the terminal.

In this implementation, preferably, some of the gap regions among the frequently used icons can be reserved for a preset number of application icons which are not dynamically distributed on the current menu page and are further not located in the frequently used icon bar.

In this implementation, preferably, when a triggering step from a user is received, the plurality of application icons can be displayed, or the application corresponding to the gap region on which the triggering operation is exerted on can be started.

In this implementation, preferably, when any of the application icons receives a message notification, the display status of the frequently used icon adjacent to the application icon the application corresponding to which has received the message notification can be changed or the background color of the region of the application icon can be changed so as to remind the user.

In this implementation, preferably, changing the display status of the adjacent frequently used icon includes changing the distance between the adjacent frequently used icon and other frequently used icons.

The foregoing descriptions are merely preferred implementations of the present disclosure, rather than limiting the present disclosure. Various modifications and alterations can be made to the present disclosure for those skilled in the art. Any modification, equivalent substitution, improvement or the like made within the spirit and principle of the present disclosure shall fall into the protection scope of the present disclosure.

What is claimed is:

1. A method for controlling display of application icons on a screen of a terminal, comprising:
   distributing, by a processor of the terminal, a first application icon in a first gap region and a second application icon in a second gap region of a frequently used icon bar on a portion of the screen of the terminal based on use frequencies; and
   displaying a change of display status of at least one frequently used application icon in the frequently used icon bar and a change of distance between two frequently used application icons of the frequently used application icons,
   wherein the first gap region and the second gap region are regions between frequently used application icons in the frequently used icon bar, wherein the first or second gap region corresponding to the first or second application icon having a higher use frequency is larger and closer to a left or right side of the terminal, wherein the frequently used application icons stay unchanged when a current menu page on the screen is changed, and wherein the first application icon is invisible after being distributed in the first gap region when an application corresponding to the first application icon receives a privacy message notification.

2. The method of claim 1, wherein at least one of the first gap region, the second gap region, or a third gap region is reserved for application icons not dynamically distributed on the current menu page and not located in the frequently used icon bar.

3. The method of claim 1, further comprising:

when a triggering operation from a user is received, displaying the first application icon distributed in the first gap region; or starting the application corresponding to the first application icon, wherein the triggering operation is exerted on the first gap region.

4. The method of claim 3, wherein the triggering operation comprises at least one of: sliding up on the screen, sliding down on the screen, a long press on the screen, or drawing an arc on the screen.

5. The method of claim 1, further comprising:

when the application corresponding to the first application icon receives a message notification, changing a background color of the first application icon, wherein the first application icon stays invisible.

6. The method of claim 1, wherein a shape of the first gap region is irregular, and a shape of the first application icon matches the shape of the first gap region.

7. A non-transitory computer-readable storage medium, comprising instructions for controlling display of application icons on a screen of a terminal, which instructions when executed by a processor, become operational with the processor to:

distribute a first application icon in a first gap region and a second application icon in a second gap region of a frequently used icon bar on a portion of the screen of the terminal based on use frequencies; and display a change of display status of at least one frequently used application icon in the frequently used icon bar and a change of distance between two frequently used application icons of the frequently used application icons, wherein the first gap region and the second gap region are regions between frequently used application icons in the frequently used icon bar, wherein the first or second gap region corresponding to the first or second application icon having a higher use frequency is larger and closer to an edge of the screen;

wherein the frequently used application icons stay unchanged when a current menu page on the screen is changed, and wherein the first application icon is invisible after being distributed in the first gap region when an application corresponding to the first application icon receives a privacy message notification.

8. The non-transitory computer-readable storage medium of claim 7, wherein a shape of the first gap region is irregular, and a shape of the first application icon matches a shape of the first gap region.

9. The non-transitory computer-readable storage medium of claim 8, wherein shapes of gap regions are similar to a puzzle.

10. The non-transitory computer-readable storage medium of claim 7, further comprising instructions, which when executed by the processor, become operational with the processor to:

when a triggering operation from a user is received, display the first application icon distributed in the first gap region; or start the application corresponding to the first application icon, wherein the triggering operation is exerted on the first gap region.

11. The non-transitory computer-readable storage medium of claim 7, further comprising instructions, which when executed by the processor, become operational with the processor to:

when the application corresponding to the first application icon receives a message notification, change a background color of the first application icon, wherein the first application icon stays invisible.

12. A terminal, comprising:

a screen configured to display application icons;

a processor; and a memory coupled to the processor, the memory configured to store instructions, which when executed by the processor, become operational with the processor to:

distribute a first application icon in a first gap region and a second application icon in a second gap region of a frequently used icon bar on a portion of the screen of the terminal based on use frequencies; and display a change of display status of at least one frequently used application icon in the frequently used icon bar and a change of distance between two frequently used application icons of the frequently used application icons, wherein the first gap region and the second gap region are regions between frequently used application icons in the frequently used icon bar, wherein the first or second gap region corresponding to the first or second application icon having a higher use frequency is larger and closer to an edge of the screen;

wherein the frequently used application icons stay unchanged when a current menu page on the screen is changed, and wherein the first application icon is invisible after being distributed in the first gap region when an application corresponding to the first application icon receives a privacy message notification.

13. The terminal of claim 12, wherein at least one of the first gap region, the second gap region, or a third gap region is reserved for application icons not dynamically distributed on the current menu page and not located in the frequently used icon bar.

14. The terminal of claim 13, wherein, when a user flips aside the current menu page, the at least one of the first gap region, the second gap region, or the third gap region is continuously updated to include an application icon in the current menu page and not in the frequently used icon bar.

15. The terminal of claim 12, wherein the memory further comprises instructions, which when executed by the processor, become operational with the processor to:

when the application corresponding to the first application icon receives a message notification, change a background color of the first application icon, wherein the first application icon stays invisible.

* * * * *